United States Patent Office 3,385,909
Patented May 28, 1968

3,385,909
POLYURETHANE RESINS BLENDED WITH POLY-LOWER ALKYL STYRENE RESINS
Earl C. Haag, Jr., Carnegie, Pa., assignor to Mobay Chemical Company, Pittsburgh, Pa., a corporation of Delaware
No Drawing. Filed Jan. 12, 1965, Ser. No. 425,084
5 Claims. (Cl. 260—859)

ABSTRACT OF THE DISCLOSURE

Polyurethane polymers having mechanically blended therein from about 0.1 to about 5 parts per 100 parts of polyurethane of a poly-lower alkyl-styrene resin having a softening point of at least 80° C. and containing at least 20% by weight of a unit having the formula

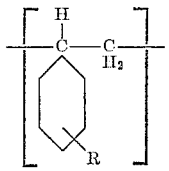

or

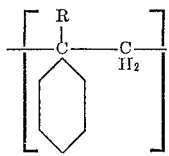

where R is a lower alkyl radical having 1 to 6 carbon atoms. The polymers have improved processing characteristics.

---

This invention relates to polyurethane plastics and particularly to polyurethane elastomers having improved processing characteristics.

It has been heretofore known to prepare polyurethane plastics utilizing various techniques. For example, an organic compound containing active hydrogen atoms can be reacted with an organic polyisocyanate to produce cellular polyurethanes, elastomeric polyurethanes and coatings. The final use of the material depends upon the particular procedure followed.

In the preparation of elastomeric polyurethanes, a high molecular weight organic compound containing active hydrogen atoms such as a polyester, a polyether or the like is reacted with an organic polyisocyanate and if desired, a chain-extending agent such as, for example, an amine, a glycol, water or the like to produce an elastomeric product. The reaction mixtures can be fabricated into the final desired shape by various techniques. In one case, the reaction compositions can be mixed together simultaneously or in steps and then immediately cast into a mold having the desired configuration. Alternatively, the reaction compositions can be mixed either simultaneously or in steps, permitted to react for a short time and then by interrupting the reaction, a pseudo thermoplastic results which can be fabricated by all the techniques suitable in the thermoplastic art. Still in another method, an interpolymer, generally referred to as a millable gum, can be prepared and this gum worked on a mill such as that used in the rubber industry, whereupon, additional ingredients and reactants, such as pigments, fillers and further quantities of curing agents such as polyisocyanates, sulfur, peroxides or the like can be added in order to effect a cure.

In all of these processes, where the reaction mixture is subjected to a subsequent shaping technique, and particularly where thermoplastic techniques are used, polyurethanes in general, do not always exhibit good processing characteristics. For example, if an extrusion or injection molding is to be made, it is sometimes difficult to fabricate the desired article.

It is therefore an object of this invention to provide polyurethane compositions having improved processing characteristics. It is another object of this invention to provide polyurethane elastomers having improved processing characteristics. It is still another object of this invention to provide polyurethane polymers processable by thermoplastic techniques which have improved processing characteristics.

The foregoing objects and others which will become apparent from the following description are accomplished in accordance with the invention generally speaking by providing polyurethan plastics having incorporated therein an effective amount of a poly-lower alkyl-styrene resin having a softening point of at least 80° C. By the incorporation of an effective amount of poly-lower alkyl-styrene in the polyurethane, the melt viscosity properties and mold release characteristics are improved.

Polyurethane elastomers are prepared by reacting an organic compound containing active hydrogen atoms which are reactive with NCO groups with an organic polyisocyanate and if desired, a chain-extending agent which can serve various functions. For example, in the preparation of a cellular polyurethane, a chain-extending agent can be water which not only reacts with isocyanate groups to link polymers together but also acts as a blowing agent by the formation of $CO_2$.

Any suitable organic compound containing active hydrogen atoms which are reactive with NCO groups such as, for example, hydroxyl polyesters, polyhydric polyalkylene ethers, polyhydric polythioethers, polyacetals and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxy-methyl-cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2′-diphenyl propane-4,4′-bis-hydroxyethylether and the like. In addition to the polyester mentioned above, it is also applicable to use polyesters prepared by reacting any of the suitable polyhydric alcohols mentioned above with lactones such as gamma-caprolactones, lactams and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may be used such as, for example, the condensates of ethylene oxide, propylane oxide, butylene oxide, amylene oxide, styrene oxide and mixtures thereof. Th polyalkylene ethers prepared from tetrahydrofuran may be used. The polyhydric polyalkylene ethers may be prepared by any known process such as, for example, the process described by Wurtz in 1859 and in the Encyclopedia of Chemical Technology, volume 7, pages 257–262, published by Interscience Publishers in 1951 or in U.S. Patent 1,922,459.

Any suitable polyhydric polythioether glycol may be used such as, for example, the reaction product of one of the aforementioned alkylene oxides used in the preparation of the polyhydric polyalkylene ether with a polyhydric thioether such as, for example, thiodiglycol, 3,3′-dihydroxy propyl sulfide, 4,4′-dihydroxy butyl sulfide, 1,4-(βhydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should preferably be substantially linear or only slightly branched and have a molecular weight of at least about 500 and for best results, a molecular weight of from about 1000 to about 3000, an hydroxyl number of from about 35 to about 80, preferably from about 50 to about 60 and an acid number less than about 2.

Any suitable organic diisocyanate may be used in reaction with the organic compound containing active hydrogen atoms to produce thermoplastically processable polyurethane polymers such as, for example, ethylene diisocyanate, ethylidene diisocyanate, propylene diisocyanate, butylene diisocyanate, hexamethylene diisocyanate, cyclopentylene-1,3-diisocyanate, cyclohexylene, 1,4-diisocyanate, cyclohexylene-1,2-diisocyanate, 2,4-toluylene diisocyanate, 2,6-toluylene diisocyanate, dimeric toluylene diisocyanate, 4,4′-diphenylmethane diisocyanate, 2,2-diphenylpropane,-4,4′-diisocyanate, p-phenylene diisocyanate, m-phenylene diisocyanate, xylylene diisocyanate, 1,4-naphthylene diisocyanate, 1,5-napthylene diisocyanate, diphenyl - 4,4′ - diisocyanate, azobenzene - 4,4′-diisocyanate, diphenylsulphone-4,4′-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4′-diphenylmethane diisocyanate or toluylene diisocyanate have proven to be especially suitable.

Any suitable chain extending agent containing active hydrogen atoms which are reactive with NCO groups and having a molecular weight less than about 500 may be used such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(β-hydroxy ethyl ether), 1,3-phenylene-bis-(β-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3′-dichlorobenzidene, 3,3′-dinitrobenzidene, 4,4′-methylene-bis(2-chloroaniline), 3,3 - dichloro-4,4′-biphenyl diamine, 2,6-diamino pyridine, 4,4′-diamino diphenylmethane and the like; alkanol amines such as, for example, ethanol amine, aminopropyl alcohol, 2,2-dimethylpropanol amine, 3-amino cyclohexyl alcohol, p-amino benzyl alcohol and the like; water, hydrazine, substituted hydrazines such as, for example, N,N′-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thio-dipropionic acid dihydrazide, tartaric acid dihydrazide, 1,3-phenylene-disulfonic acid dihydrazide, omega-amino-capronic acid dihydrazide, gamma-hydroxy butyric hydrazide, bis-semi-carbazide, bis-hydrazine carbonic esters of glycols such as, many of the glycols heretofore mentioned and the like.

The polyurethanes may also be prepared by reacting the bis-chloroformates of any of the organic compounds containing active hydrogen atoms mentioned above with an organic diamine such as those set forth above in the discussion of the chain-extending agents. Optionally, bis-chloroformate of a low molecular weight glycol can be used in addition to the high molecular weight bis-chloroformates.

The poly-lower alkyl-styrene resin is incorporated into the polyurethane in an effective amount to produce the improved processing characteristics. Generally, at least 0.1 part of the poly-lower alkyl-styrene resin is used per 100 parts of the polyurethane. Preferably, from about 0.5 to about 5 parts per 100 parts of the polyurethane are used.

Any suitable poly-lower alkyl-styrene resin having a softening point of from about 80° C. to about 250° C. including those having the repeating units

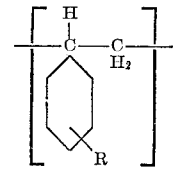

or

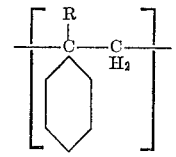

where R is a lower alkyl radical having from 1 to 6 carbon atoms such as methyl, ethyl, propyl, isopropyl, butyl, isobutyl, tert.-butyl, pentyl, isopentyl, tert.-pentyl hexyl, isohexyl and the like, including homopolymers and copolymers thereof.

The preferred compounds utilized in accordance with this invention include poly-α-methylstyrene resins and polyvinyl toluene resins. These materials are described more particularly on pages 518–522 of Polymers and Resins, by Golding, published by D. Van Nostrand Co., Inc., 1959. The invention contemplates not only homopolymers having the repeating units set forth but also copolymers of these materials with other compounds containing ethylenically unsaturated groups such as, for example, styrene. The groups set forth above, however, should be present in the copolymers in an amount of at least about 20% by weight. In addition to the alkyl groups on the benzene ring, both the vinyl lower alkyl polymers and the poly-lower alkylstyrene polymers may contain other substituents in the benzene rings such as, for example, additional alkyl groupings, alkoxy groups such as ethoxy, methoxy, butoxy, pentoxy, octadecoxy and the like; halogen atoms including bromine, chlorine, iodine and fluorine, nitro groups and the like. Both graft copolymers and other copolymers are suitable in accordance with this invention. Any of the resins disclosed in Canadian Patent 680,777 and in U.S. Patents 2,474,671, 2,773,052 and 3,000,868 may be used in accordance with this invention. The polymer incorporated into the polyurethane should have a softening point as measured by ball or shouldered in accordance with ASTM method E28–58T of from about 80° C. to about 250° C. and preferably to 100–250° C.

It has been observed that an alkyl group substituted on the alpha carbon atom of styrene or somewhere on the benzene ring, is required in order for compatibility with urethane resins to be obtained. When polystyrene is attempted to be used, the material cannot be mixed with the polyurethane in effective amounts and therefore does not achieve the improvement in melt index and mold release as that of the instant invention.

As the poly-lower alkyl-styrene resins are non-reactive with either the reactants used in the preparation of the polyurethanes or the polyurethanes themselves, the poly-lower alkyl-styrene can be incorporated into the polyurethanes at any convenient step in the preparation of the polyurethane polymers per se or in the fabrication steps used in the preparation of the finished article. In the preparation of the compositions in accordance with this invention where a thermoplastic polymer is used, the poly-lower alkyl-styrene resin can be added to the polyurethanes by blending the solid particles together by heating the polyurethanes until it is in the molten state and then adding the poly-lower alkyl-styrene resin and continuing heavy mixing such as in suitable apparatuses such as Banbury mixer. Of course, as stated above, the poly-lower alkyl-styrene resin can also be added at the time the reaction compositions are initially mixed and reacted. This would be the preferred time of addition when a cellular polyurethane is prepared. When the millable gum technique is followed, the preferred time of adding the poly-lower alkyl-styrene resin is on a rubber mill when the additional curing agent and other ingredients such as pigments are added.

The invention is further illustrated but not limited by the following examples in which parts are by weight unless otherwise specified.

EXAMPLE 1

The preparation of a thermoplastic polyurethane

To about 100 parts of an hydroxyl terminated polyester having an hydroxyl number of about 56, an acid number less than 1 and a molecular weight of about 2000 and prepared by reacting about 10 mols of adipic acid and 11 mols of 1,4-butanediol are added about 33 parts of 1,4-phenylene bis-(β-hydroxy ethyl ether). This mixture is heated to about 105° C. To the previously prepared mixture of active hydrogen compounds is added at a temperature of about 105° C. about 60 parts of 4,4'-diphenylmethane diisocyanate. The reaction mixture is then immediately cast onto a heated support maintained at a temperature of about 7–8 minutes at which time solidification has occurred which permits the removal of the solid from the table. The material is then ground to reduce the particle size thereof.

EXAMPLE 2

To about 100 parts of the polyurethane prepared in accordance with Example 1 are added about 2 parts of a homopolymer of poly-α-methylstyrene having a softening point of about 115° C. The material is then Banburyed at 400° F. for about 10 minutes. A sample with and without additive is then run in order to determine the melt index. The melt index, referred to herein is a measurement to determine the melt behavior of a polymer, thus indicating the degree of ease with which the polymer flows. Such measurements are made in a capillary rheometer as described in the Journal of Polymer Science, Part A, vol. 1, pp. 3395–3406, 1963. The melt index determinations are run at a definite temperature with a predetermined load applied. The orifice through which the material being measured is forced is predetermined and is indicated generally by a value obtained by dividing the length of the orifice by the diameter thereof. This procedure is taken from ASTM, 1238–62T. The values recorded in Table I at 5, 10, 15 and 20 minutes in the heated cylinder indicate the improved melt flow characteristics of the material containing the poly-α-methylstyrene over a control having no additive added thereto.

TABLE I.—MELT INDEX (G./10 MIN.)

| | Urethane Polymer | Urethane Polymer With Additive |
|---|---|---|
| Time in Melt Index Apparatus: | | |
| 5 min | 1.1 | 6.4 |
| 10 min | 1.2 | 6.8 |
| 15 min | 1.0 | 6.3 |
| 20 min | 0.8 | 6.6 |

EXAMPLE 3

About 1000 parts of a polyester prepared from adipic acid and ethylene glycol and having an hydroxyl number of 53 and an acid number of 1 are reacted at a temperature of about 130° C. with about 140 parts of 1,5-naphthylene diisocyanate. About 33 parts of 1,4-cyclohexane diol are stirred into the mix at a temperature of about 125° C. until the mass becomes very viscous. The mix is then placed on a 2 roll mill such as used in the rubber industry and about 20 parts of a poly-α-methylstyrene-tetrahydrofuran copolymer containing 61 percent by weight of poly-α-methylstyrene and having a softening of 169° C. and about 51.7 parts of 1,5-naphthylene diisocyanate are incorporated therein. This material is then compression molded into a disced shaped test sample which fills the mold completely and is readily removed from the mold without previously applying any mold release agent.

EXAMPLE 4

The process of Example 1 is conducted with the exception that 9 parts of butanediol and 40 parts of 4,4'-diphenylmethane diisocyanate are used in place of the quantities used in Example 1. About 100 parts of the material after solidification is placed in a Banbury mixer together with about 1 part of a poly-α-methylstyrene-styrene copolymer having about 80% by weight of poly-α-methylstyrene and a softening point of about 133° C. Mixing is continued until a homogeneous mixture results. The mixture is then charged onto a calendering apparatus and thin films are calendered. Noticeable sticking to the apparatus occurs and the material has a very uniform appearance.

EXAMPLE 5

To about 100 parts of the ground thermoplastic polyurethane prepared in accordance with Example 1 is added about 1 part of a copolymer of alpha methylstyrene and vinyl toluene. This mixture is dry blended and extruded into strands. The extrudate is of good quality, being smooth and having good hot strength. The strands are passed through a cutter to reduce them to pellets suitable for fabrication by conventional thermoplastic methods.

Melt index values recorded in Table II and obtained by the method described in Example 2 indicate improved processability of the material containing the alpha methylstyrene-vinyl toluene copolymer over a control having no additive added thereto without at all decreasing the physical properties.

TABLE I.—MELT INDEX (G./10 MIN.)

| Time in Melt Index Apparatus: | Urethane Polymer | Urethane Polymer With Additive |
|---|---|---|
| 5 min | 2.0 | 15 |
| 10 min | 2.0 | 14 |
| 15 min | 2.4 | 13 |
| 20 min | 2.8 | 13 |

EXAMPLE 6

The pelletized urethane composition containing additive of Example 5 is injection molded into various physical shapes. Physical properties of these molded articles are determined after curing 16 hours at 110° C. in a circulating air oven. Physical properties for these cured molded articles containing the alpha methylstyrene-vinyl toluene copolymer are recorded in Table III along with a control urethane resin without processing aid.

TABLE III

| | Urethane Polymer With Additive | Urethane Polymer |
|---|---|---|
| Shore D Hardness | 52 | 53 |
| Tensile strength, p.s.i | 5,400 | 5,500 |
| Elongation, percent | 500 | 460 |
| Elongation Set, percent | 40 | 40 |
| 100% Modulus, p.s.i | 2,030 | 2,180 |
| 200% Modulus, p.s.i | 2,520 | 2,700 |
| 300% Modulus, p.s.i | 3,310 | 3,590 |
| Tear Strength, p.s.i | 890 | 850 |
| Compression/Deflection: | | |
| 10% deflection, p.s.i | 960 | 1,000 |
| 25% deflection, p.s.i | 2,660 | 2,640 |
| Abrasion Index | 0.23 | 0.21 |
| Compression Set, percent | 25 | 27 |

It is noted that the excellent physical properties of the urethane elastomer do not suffer from the addition of this alpha methylstyrene copolymer. It is also noted that during the fabrication of molded articles from the composition of Example 5, no mold release agent was required. The mold cavity was filled easily with good surface definition. The release characteristics of the urethane elastomer containing alpha methylstyrene copolymer were superior to a control urethane elastomer without additive.

EXAMPLE 7

To about 100 parts of an hydroxyl terminated polyester having an hydroxyl number of about 56, an acid number less than 1 and a molecular weight of about 2000 and prepared by reacting about 10 mols of adipic acid and 11 mols of 1,4-butanediol are added about 34 parts of 1,4-phenylene-bis-(β-hydroxy ethyl ether) and about 5 parts of alpha methylstyrene-vinyl toluene copolymer of about 120° C. ring and ball softening point. This mixture is heated with agitation to about 140° C. To the previously prepared mixture of active hydrogen compounds is added at a temperature of about 60° C., about 60 parts of 4,4'-diphenylmethane diisocyanate. The reaction mixture is cast immediately onto a heated support of about 110° to about 115° C. where it remains for a period of about 10 minutes at which time solidification has occurred which permits the removal of the solid from the table. The material is then ground to reduce the particle size thereof. Upon injection molding of this material, the processing advantages of increased melt flow and improved mold release are achieved.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

I claim:

1. As a new composition of matter, a polyurethane plastic having mechanically blended therein from about 0.1 to about 5 parts per 100 parts of polyurethane of a poly-lower alkyl-styrene resin having a softening point of at least about 80° C., said poly-lower alkyl-styrene resin containing at least 20% by weight of a unit selected from the group consisting of

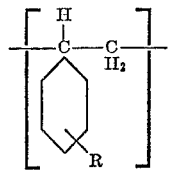

and

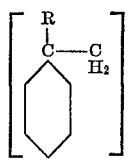

where R is a lower alkyl radical having 1–6 carbon atoms.

2. The composition of claim 1 wherein the poly-lower alkylstyrene resin is a poly-α-methylstyrene resin.

3. The composition of claim 1 wherein the poly-lower alkylstyrene resin is a poly-vinyltoluene.

4. The composition of claim 1 wherein the poly-lower alkylstyrene resin has a softening point of from about 100° C. to about 250° C.

5. The composition of claim 1 wherein the poly-lower alkylstyrene resin is incorporated in the amount of from about 0.5 to about 5 parts per 100 parts of polyurethane.

References Cited

UNITED STATES PATENTS 3,027,343   3/1962   Kane _____ 260—859
3,106,537   10/1963  Simon _____ 260—859

FOREIGN PATENTS 631,690   11/1961   Canada.

MURRAY TILLMAN, Primary Examiner.

GEORGE F. LESMES, Examiner.

P. LIEBERMAN, Assistant Examiner.